Jan. 29, 1924.    1,482,114
H. M. BREWSTER
SNUBBER FOR VEHICLE SPRINGS
Filed May 5, 1923

Witness:
R. Burkhardt

Inventor:
Herbert M. Brewster,
By Walter M. Fuller
Atty.

Patented Jan. 29, 1924.

1,482,114

UNITED STATES PATENT OFFICE.

HERBERT M. BREWSTER, OF CHICAGO, ILLINOIS.

SNUBBER FOR VEHICLE SPRINGS.

Application filed May 5, 1923. Serial No. 636,846.

*To all whom it may concern:*

Be it known that I, HERBERT M. BREWSTER, a citizen of the United States, residing at Chicago, in the county of Cook and State of Illinois, have invented certain new and useful Improvements in Snubbers for Vehicle Springs, of which the following is a specification.

This invention relates to devices commonly known as snubbers, intended to oppose and check the recoil movement of vehicle springs, and more particularly leaf springs of the semi-elliptical type commonly employed in automobiles and other motor vehicles. The object of the invention is to provide a simple, inexpensive, easily applied and efficient snubber for the situations and purposes specified.

My invention, its mode of operation, and its practical usefulness to prevent violent recoil of vehicle springs will be readily understood and appreciated by persons skilled in the art from the following detail description, taken in connection with the accompanying drawing in which I have illustrated a practical and approved embodiment of my invention and wherein—

Figure 1:
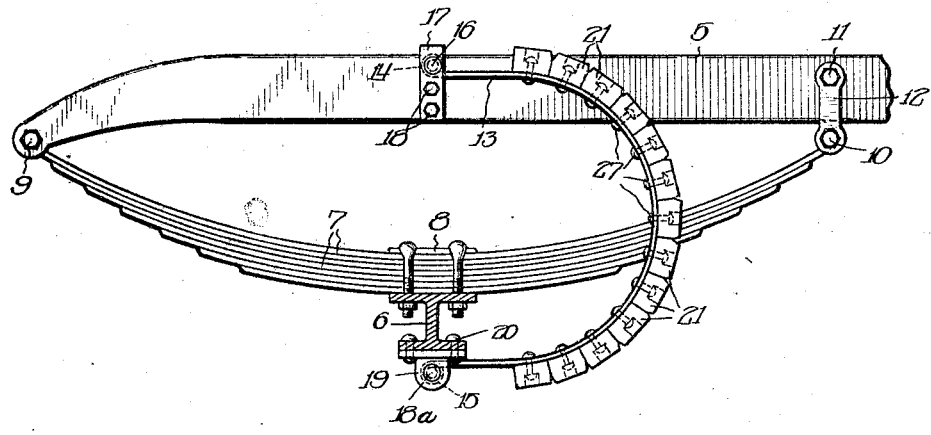
Fig. 1 is a side elevation of one end of a vehicle side frame member, the underlying axle, and the vehicle supporting spring mounted on the axle and connected to the side frame member, with my improved snubber applied thereto.
Figure 2:
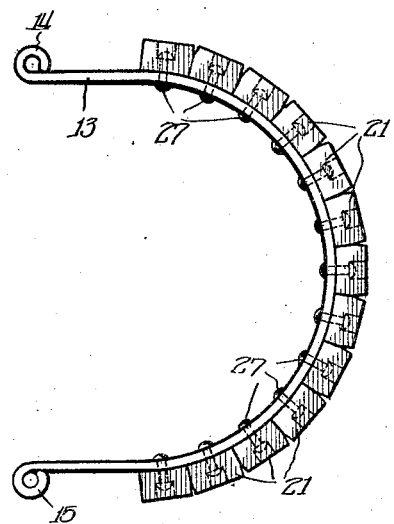
Fig. 2 is an enlarged side elevation of the snubber detached.
Figure 3:
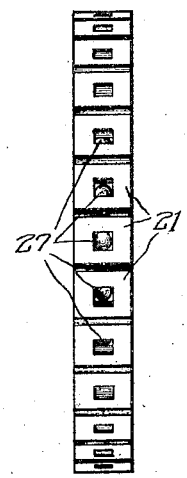
Fig. 3 is an outer side elevation of the snubber as viewed from the right of Fig. 2.

Referring to the drawing, 5 designates an end portion of the side frame member of an automobile chassis, 6 designates the axle, and 7 designates a semi-elliptic leaf spring attached to the axle by clips 8 and at its ends connected to the side frame member 5 by pivot bolts 9, 10 and 11 and a link 12; these parts being all as usual in automobile construction.

Referring now to my present improvement, 13 designates a curved spring bar herein shown as approximately semi-circular in form. The ends of the bar terminate in upper and lower eyes 14 and 15, the former being engaged by a pin 16 projecting laterally from a bracket plate 17 that is attached to the side frame member 5 as by bolts 18; and the lower eye 15 being engaged by a pin 18ᵃ projecting from a lug 19 that is bolted or riveted, as shown at 20 to the lower side of the axle 6. Any other suitable or convenient means for attaching the bar 13 to the side frame member and to the axle or main semi-elliptic spring may be employed within the purview of the invention.

Attached to the outer or convex side of the spring bar 13 is a row of contiguous resilient compressible blocks 21. These blocks preferably consist of solid rubber, and are simply and conveniently fastened to the spring bar by countersunk rivets 22, as shown. The adjacent sides of adjacent blocks lie in contact throughout the greater part or all of their depth, as shown, so that a straightening movement of the bar due to a separating movement of its ends sets up mutual compression between the blocks of the series which strongly opposes such straightening movement of the bar. This, of course, acts to check and oppose the recoil movements of the main semi-elliptic spring 7 which tends to throw the side frame member upwardly relatively to the axle, or the axle downwardly relatively to the side frame member. The device thus functions in a manner to steady the movements of the main supporting spring, checking recoil of the latter, and insuring a substantially vibrationless travel of the vehicle frame and body over rough roads.

The drawings show the spring bar 13 in its neutral position. Under heavy loads and on rough roads it causes no interference with the normal bending movement of the spring 7, since it offers but slight resistance to an inward bending movement. It, however does present substantial resistance to the return or recoil movements of the semi-elliptic spring 7, thus holding the body of the vehicle down to the road and preventing the bouncing and lurching movements of the vehicle body frequently experienced on uneven roadways where no recoil checking means are employed.

In some cases it may be desirable to remove the rubber blocks after they have become unduly worn and in such cases it may be preferable to secure them in place by bolts instead of rivets which construction is the equivalent of that shown and described in detail, but in other cases the rivets may be preferable because they assure the maintaining of the appliance in place without possibility of loosening the attachments under the vibratory strain to which the fastening means are subjected.

Under normal load conditions or when the vehicle is without load, the rubber or cushioning blocks may be so arranged as to be slightly spaced apart or out of contact and to be brought progressively into contact and pressing action as the curved spring bar tends to straighten out. The word "contiguous" used herein is employed in its broad sense of contacting or adjacent without actual contact.

I claim—

1. The combination, with a vehicle side frame member, an axle, and a supporting spring between said side frame member and said axle, of means for opposing recoil of said spring comprising a curved spring bar connected at its upper and lower ends to said side frame member and supporting spring respectively and having on its convex side a row of contiguous resilient compressible blocks serving to oppose straightening movement of said spring bar.

2. The combination, with a vehicle side frame member, an axle, and a semi-elliptic spring supporting said side frame member on said axle, of means for opposing recoil of said spring comprising an approximately semi-circular spring bar connected at its upper and lower ends to said side frame member and supporting spring respectively and having attached to its convex side a row of contiguous resilient compressible blocks serving to oppose straightening movement of said spring bar.

3. The combination, with a vehicle side frame member, an axle, and a semi-elliptic spring supporting said side frame member on said axle, of a device for opposing recoil of said spring comprising an approximately semi-circular spring bar pivotally attached at its upper end to said side frame member and pivotally attached at its lower end to said axle, said spring bar having attached to its convex side a row of contiguous solid rubber blocks serving to oppose straightening movement of said spring bar.

4. As a new article of manufacture, a snubber for vehicle springs, consisting of a curved spring bar having on its convex side a row of contiguous resilient compressible blocks acting to oppose straightening movement of said bar.

5. As a new article of manufacture, a snubber for vehicle springs, consisting of an approximately semi-circular spring bar formed with attaching means at its ends and having attached to its convex side a row of contiguous resilient compressible blocks acting to oppose straightening movement of said bar.

6. As a new article of manufacture, a snubber for vehicle springs, consisting of an approximately semi-circular spring bar formed with attaching eyes at its ends and having attached to its convex side a row of contiguous solid rubber blocks acting to oppose straightening movement of said bar.

In witness whereof I have hereunto set my hand and seal.

HERBERT M. BREWSTER. [L. S.]